(12) United States Patent
Leiden et al.

(10) Patent No.: US 8,478,892 B2
(45) Date of Patent: Jul. 2, 2013

(54) SESSION INITIATION PROTOCOL (SIP) OVERLOAD PROTECTION

(75) Inventors: Stevan H. Leiden, Norwood, MA (US); Brian Somes, Garland, TX (US); Timothy W Bischoff, Highland Village, TX (US); Arthur Doskow, New York, NY (US); Kevin V Bohn, Rockville Centre, NY (US); Gary L Lockhart, Allen, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/617,025

(22) Filed: Sep. 14, 2012

(65) Prior Publication Data

US 2013/0013771 A1 Jan. 10, 2013

Related U.S. Application Data

(62) Division of application No. 12/099,408, filed on Apr. 8, 2008, now Pat. No. 8,285,868.

(51) Int. Cl.
*G06F 15/16* (2006.01)

(52) U.S. Cl.
USPC ............ 709/233; 709/230; 709/232; 709/235

(58) Field of Classification Search
USPC .................. 709/230, 232, 233, 235
See application file for complete search history.

(56) References Cited

U.S. PATENT DOCUMENTS

| | | | |
|---|---|---|---|
| 5,943,480 A * | 8/1999 | Neidhardt | 709/226 |
| 6,538,998 B1 * | 3/2003 | Garimella | 370/241 |
| 7,508,763 B2 * | 3/2009 | Lee | 370/235 |
| 7,522,581 B2 | 4/2009 | Acharya et al. | |
| 2003/0210649 A1 * | 11/2003 | Bondi | 370/229 |
| 2006/0188079 A1 * | 8/2006 | Tu et al. | 379/210.01 |
| 2007/0104212 A1 * | 5/2007 | Gutman | 370/428 |
| 2007/0153689 A1 * | 7/2007 | Strub et al. | 370/230 |
| 2007/0233896 A1 * | 10/2007 | Hilt et al. | 709/238 |
| 2007/0253412 A1 | 11/2007 | Batteram et al. | |
| 2008/0077997 A1 * | 3/2008 | Miyata et al. | 726/28 |
| 2008/0117816 A1 * | 5/2008 | Stone et al. | 370/230.1 |
| 2008/0198746 A1 * | 8/2008 | Kwan et al. | 370/231 |
| 2008/0198748 A1 * | 8/2008 | Gilfix et al. | 370/235 |
| 2008/0205277 A1 * | 8/2008 | Ibezim et al. | 370/235 |
| 2009/0122705 A1 | 5/2009 | DeVal et al. | |

OTHER PUBLICATIONS

Hilt et al, Session Initiation Protocol (SIP) Overload Control, draft-hilt-sipping-overload-03, Oct. 26, 2007, pp. 1-33, http://tools.ietf.org/pdf/draft-hilt-sipping-overload-03.pdf.*

Hilt et al., "Session Initiation Protocol (SIP) Overload Control", http://tools.ietf.org/pdf/draft-hilt-sipping-overload-03.pdf, Oct. 26, 2007, 33 pages.

J. Rosenberg, "Requirements for Management of Overload in the Session Initiation Protocol", draft-ietf-sigging-overload-reqs-00, Nov. 27, 2006, 22 pages.

(Continued)

*Primary Examiner* — Hieu Hoang

(57) ABSTRACT

A device receives a Session Initiation Protocol (SIP) response that includes a load header associated with a downstream Session Initiation Protocol (SIP) device. The device also determines an amount of traffic to send to the downstream Session Initiation Protocol (SIP) device based on the load header. The device further sends the determined amount of traffic to the downstream Session Initiation Protocol (SIP) device.

20 Claims, 13 Drawing Sheets

OTHER PUBLICATIONS

Telcordia Technologies, Inc., "Network Traffic Management", A Module of OTGR, FR-439 and LSSGR, FR-64, GR-477-CORE, Issue 4, , Feb. 2000, 234 pages.

Rumsewicz et al., "A Comparison of SS7 Congestion Control Options During Mass Call-In Situations", IEEE/ACM Transactions on Networking, vol. 3, No. 1, Feb. 1995, 9 pages.

Alliance for Telecommunications Industry Solutions, "American National Standard for Telecommunications—Signaling System No. 7 (SS7)—Integrated Services Digital Network (ISDN) User Part", T1.113-2000, Section 2.11, Automatic congestion Control, 2000, 479 pages.

Telcordia Technologies, Inc., "LSSGR: Switching System Generic Requirements for Call Control Using the Integrated Services Digital Network User Part (ISDNUP)", A Module of LSSGR, FR-64, GR-317-CORE, Release 3, Nov. 1999, 206 pages.

Smith, "Ensuring Robust Call Throughput and Fairness for SCP Overload Controls", IEEE/ACM Transactions on Networking, vol. 3, No. 5, Oct. 1995, pp. 538-548.

Hilt et al., "Session Initiation Protocol (SIP) Overload Control", draft-hilt-sipping-overload-02, Jul. 8, 2007, 27 pages.

* cited by examiner

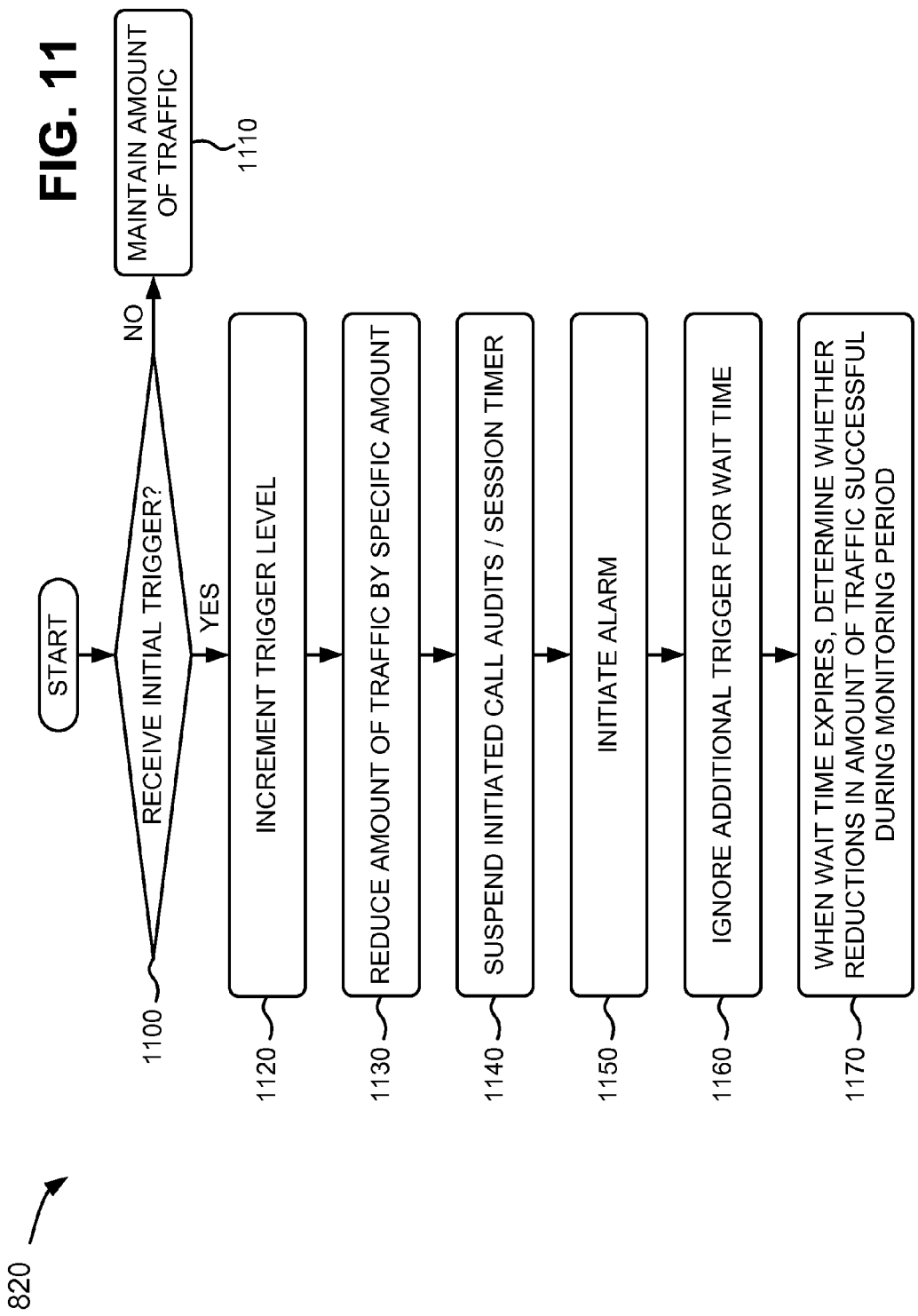

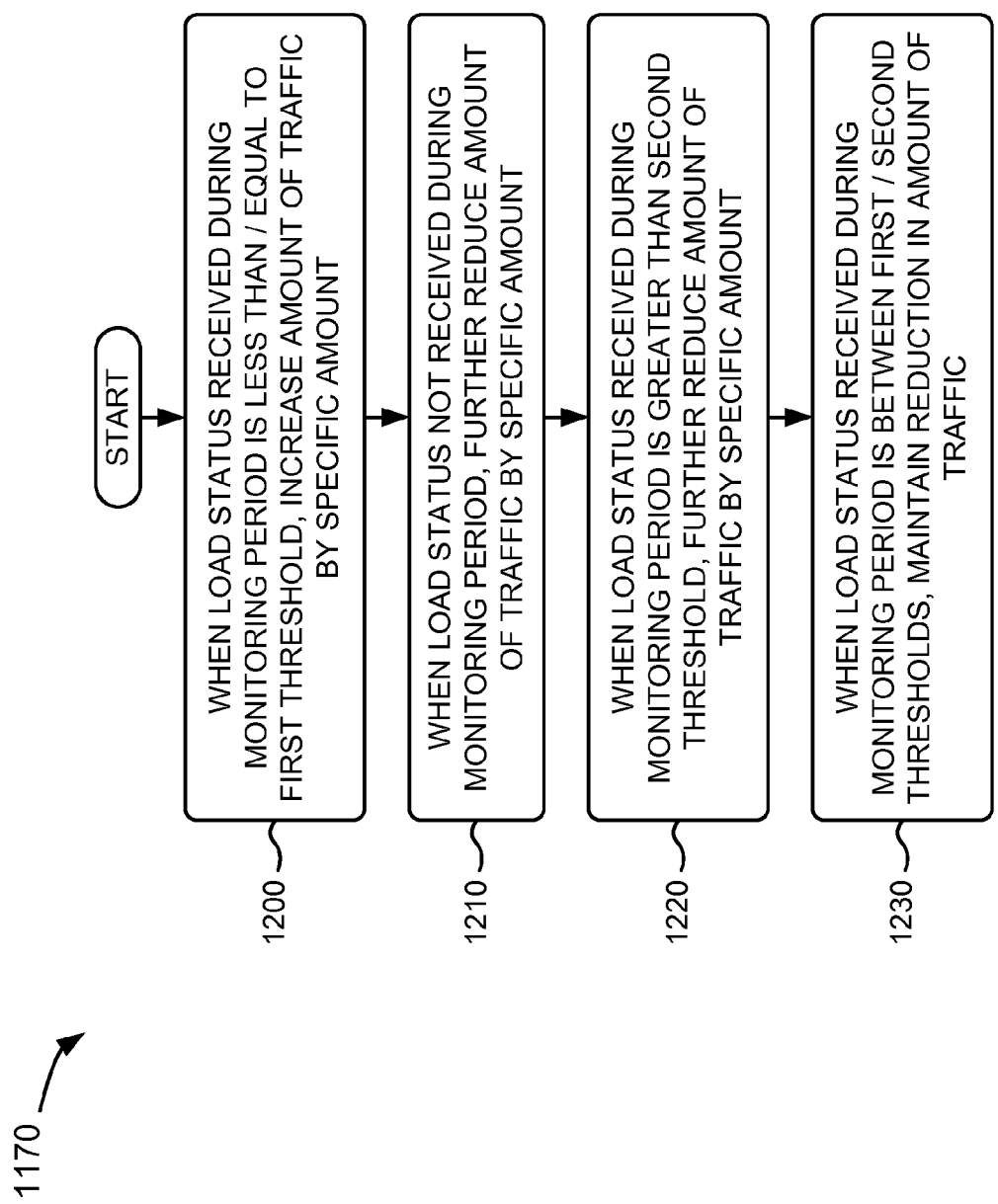

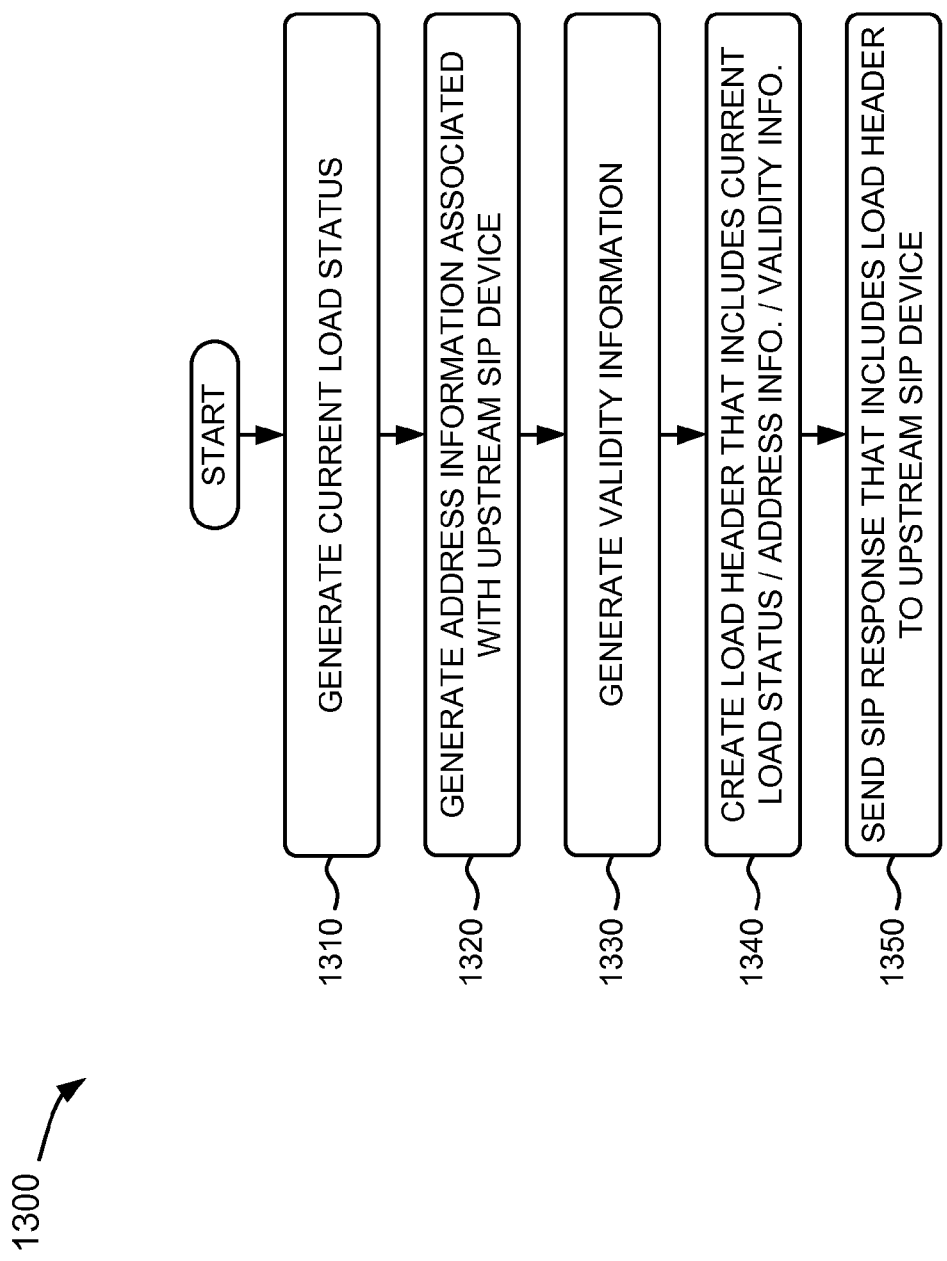

SESSION INITIATION PROTOCOL (SIP) OVERLOAD PROTECTION

RELATED APPLICATION

This application is a divisional of U.S. patent application Ser. No. 12/099,408, filed Apr. 8, 2008, the disclosure of which is incorporated by reference herein in its entirety.

BACKGROUND

Session Initiation Protocol (SIP) is an application-layer control (i.e., signaling) protocol for creating, modifying, and terminating sessions with one or more participants. These sessions may support the transport of traffic, such as Internet-based telephone calls, multimedia distribution, multimedia conferences, instant messaging conferences, interactive voice response (IVR), automated and manual operator services, automatic call distribution, call routing, etc. SIP invitations messages or INVITEs may be used to create sessions and may carry session descriptions that allow participants to agree on a set of compatible media types. SIP may use SIP-based devices (e.g., proxy servers) to help route requests to a specified user's current location, authenticate and authorize users for services, implement provider-specified call-routing policies, and/or provide other features to users.

A SIP-based device may experience overload conditions when it has insufficient resources to keep up with a volume of traffic it is being asked to process (e.g., due to a lack of SIP signaling resources). Resources may include components of the SIP-based device used to process traffic, such as a central processing unit (CPU), memory, input/output, a disk, etc., as well as external resources, such as databases, domain name service (DNS) servers, etc.

SIP provides only a basic mechanism for automatically reducing traffic and performing overload control, through its "503" (Service Unavailable) response code. However, this mechanism fails to prevent overload of a SIP-based device, and fails to prevent a collapse in functionality due to congestion. Use of the "503" (Service Unavailable) mechanism may even cause problematic traffic load to oscillate and to shift between SIP-based devices, and thereby worsen an overload condition. The Internet Engineering Task Force (IETF) is currently studying new overload control mechanisms for the SIP protocol, but has not specified explicit mechanisms.

BRIEF DESCRIPTION OF THE DRAWINGS

FIGS. 8-13 illustrate flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a rate-based overload control mechanism for use in networks employing the Session Initiation Protocol (SIP) for session management (e.g., call initiation, modification, termination, etc.). The overload control mechanism may provide hop-by-hop traffic management (e.g., independently between a pair of adjacent SIP-based devices, regardless of session initiation and termination endpoints). For example, one or more upstream SIP-based devices (e.g., devices sending traffic) may be nearest neighbors (on a signaling basis) to an overloaded downstream SIP-based device (e.g., a device receiving traffic). The one or more upstream SIP-based devices may attempt to reduce a traffic load of the downstream SIP-based device via the overload control mechanism. A downstream SIP-based device utilizing the overload control mechanism may include a SIP header that contains its current load status in its SIP responses. The overload control mechanism may further reduce and/or restore traffic, sent by upstream SIP-based devices, based on the load information provided in the SIP responses. For example, an upstream SIP-based device may actively determine an amount of traffic to send to a downstream SIP-based device based on a load status of the downstream SIP-based device, as communicated in the headers of its SIP response messages. While the foregoing description focuses on the SIP protocol, in other implementations, the techniques described herein may be equally applicable to other communication protocols.

Figure 1:
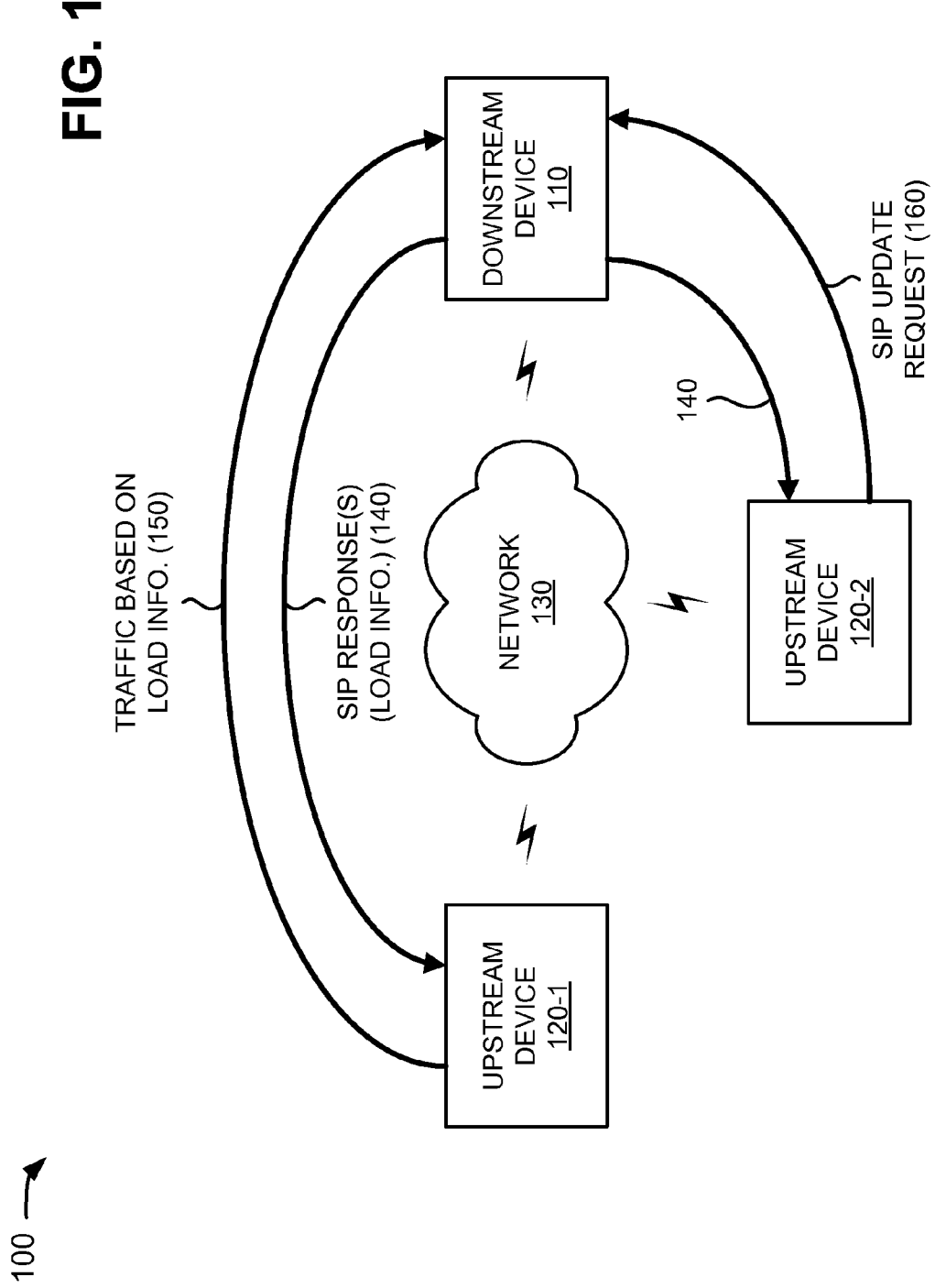
FIG. 1 is a diagram of an exemplary network in which systems and methods described herein may be implemented.

FIG. 1 is a diagram of an exemplary network 100 in which systems and methods described herein may be implemented. As illustrated, network 100 may include a downstream device 110 and upstream devices 120-1 and 120-2 (collectively referred to herein as "upstream devices 120" and singularly as "upstream device 120") interconnected by a network 130. Downstream device 110 and/or upstream devices 120 may connect to network 130 via wired and/or wireless connections. A single downstream device and network, and two upstream devices have been illustrated in FIG. 1 for simplicity. In practice, there may be more downstream devices, upstream devices, and/or networks. Also, in some instances, one or more of downstream device 110 and/or upstream devices 120 may perform one or more functions described as being performed by another one or more of downstream device 110 and/or upstream devices 120. For example, in one implementation, because a device (e.g., downstream device 110 and/or upstream devices 120) may generate and receive traffic, such a device may act concurrently as a downstream device with regard to some devices and as an upstream device with regard to the same or other devices.

Downstream device 110 may include one or more server entities, or other types of computation or communication devices, that gather, process, search, and/or provide information in a manner described herein. For example, in one implementation, downstream device 110 may include a gateway (e.g., an Internet protocol (IP)/Public Switched Telephone Network (PSTN) gateway, a media gateway, etc.), a softswitch, a switch, an IP private branch exchange (IPBX), a proxy server, a session border controller (SBC), a network interface card (NIC), a hub, a bridge, a router, etc. that support SIP as a signaling protocol. Further details of downstream device 110 are provided below in connection with, for example, FIGS. 2-4.

Upstream device 120 may include one or more server entities, or other types of computation or communication devices, that gather, process, search, and/or provide information in a manner described herein. For example, in one implementation, upstream device 120 may include a gateway (e.g., an Internet protocol (IP)/Public Switched Telephone Network (PSTN) gateway, a media gateway, etc.), a softswitch, a switch, an IP private branch exchange (IPBX), a proxy server, a session border controller (SBC), a network interface card (NIC), a hub, a bridge, a router, etc. that support SIP as a signaling protocol. Further details of upstream device 120 are provided below in connection with, for example, FIGS. 2 and 5-7.

Network 130 may include a local area network (LAN), a wide area network (WAN), a metropolitan area network (MAN), a telephone network, such as the PSTN, an intranet, the Internet, a SIP-based network, a Voice over Internet Protocol (VoIP)-based network, or a combination of networks.

As further shown in FIG. 1, downstream device 110 may generate one or more SIP responses or messages 140 that include load information associated with downstream device 110. The load information may include current load status information associated with downstream device 110. For example, in one implementation, a load status value may range from a first (low) value (e.g., "0," which may indicate that downstream device 110 is idle, and thus has no load) to a second (high) value (e.g., "99," which may indicate that downstream device 110 is completely overloaded). Downstream device 110 may provide SIP responses 140 to upstream devices 120. Downstream device 110 may generate continuous, periodic SIP responses 140 to provide upstream devices 120 with load status updates associated with downstream device 110. Although not shown in FIG. 1, upstream devices 120 may provide SIP invite messages, which may elicit SIP responses 140, to downstream device 110.

Upstream devices 120 may receive SIP responses 140, and may determine a maximum allowable amount of traffic to send to downstream device 110 based on the load information contained in SIP responses 140. Upstream devices 120 (e.g., upstream device 120-1, as shown in FIG. 1) may send traffic 150, limited consistent with the provided load information, to downstream device 110. If downstream device 110 fails to provide SIP responses 140 to traffic 150 in a timely manner (i.e., there is a period of silence between SIP responses 140), then upstream devices 120 (e.g., upstream device 120-2, as shown in FIG. 1) may issue a SIP UPDATE request 160 to downstream device 110. SIP UPDATE request 160 may request downstream device 110 to provide SIP responses 140 that include load information to the sending upstream device 120-2.

Continuous and periodic load status updates, provided by SIP responses 140, may enable one or more of upstream devices 120 to act on reported load status information that it recognizes as conveying an onset of overload in downstream device 110. One or more of upstream devices 120 may automatically reduce its traffic to download device 110 in a controlled, step-wise fashion so that downstream device 110 may start to recover from the overload recognized by one or more of upstream devices 120. The traffic reduction may attempt to retain as much of the traffic flow to downstream device 110 as possible while still easing the congestion at downstream device 110. The automatic traffic handling may eventually reach equilibrium, where a reduced amount of traffic may be delivered for processing by the available limited resources of downstream device 110. When one or more upstream devices 120 recognizes (e.g., via load information contained in SIP responses 140) that the overload condition is abating, the one or more upstream devices 120 may automatically relieve the restrictions on sent traffic volume in a controlled step-wise fashion until traffic can resume unabated. This may permit the gradual resumption of traffic to downstream device 110 allowing it to recover from the overload without experiencing a dramatic resurgence of traffic.

Figure 2:
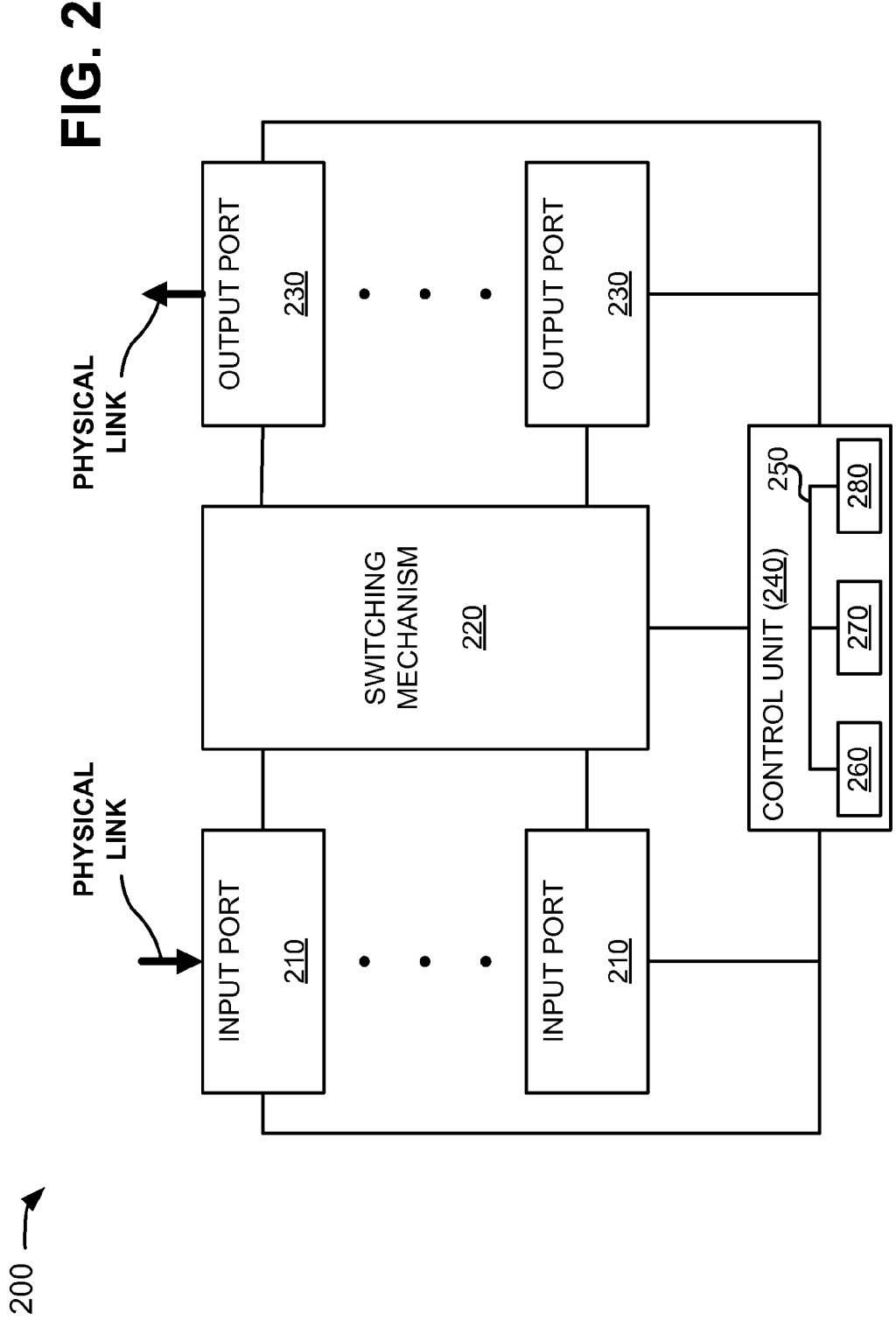
FIG. 2 illustrates exemplary components of a downstream device and/or upstream devices of the network depicted in FIG. 1.

FIG. 2 is an exemplary diagram of a device 200 that may correspond to any of downstream device 110, upstream device 120-1, and/or upstream device 120-2. As illustrated, device 200 may include input ports 210, a switching mechanism 220, output ports 230, and/or a control unit 240. Input ports 210 may be the points of attachments for physical links and may be the points of entry for incoming traffic. Switching mechanism 220 may interconnect input ports 210 with output ports 230, and may connect to control unit 240. Output ports 230 may store the traffic and may schedule the traffic on one or more output physical links. Control unit 240 may use routing protocols and may create a forwarding table that is used in traffic forwarding.

Input ports 210 may look up a destination address of incoming traffic (e.g., any type or form of data, such as packet or non-packet data) in a forwarding table to determine its destination port (i.e., route lookup). In order to provide quality of service (QoS) guarantees, input ports 210 may classify traffic into predefined service classes. Input ports 210 may run datalink-level protocols and/or network-level protocols.

Switching mechanism 220 may provide a link between input ports 210 and output ports 230. For example, switching mechanism 220 may include a group of switching devices that route traffic from input ports 210 to output ports 230.

Output ports 230 may store traffic before it is transmitted on an output link. Output ports 230 may include scheduling processes that support priorities and guarantees. Output ports 230 may support a variety of higher-level protocols.

Control unit 240 may interconnect with input ports 210, switching mechanism 220, and output ports 230. Control unit 240 may compute a forwarding table, use routing protocols, and/or run software to configure and manage device 200. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

As described herein, device 200 may perform certain operations. Device 200 may perform these operations in response to processor 260 executing software instructions contained in a computer-readable medium, such as memory 270. A computer-readable medium may be defined as a physical or logical memory device.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
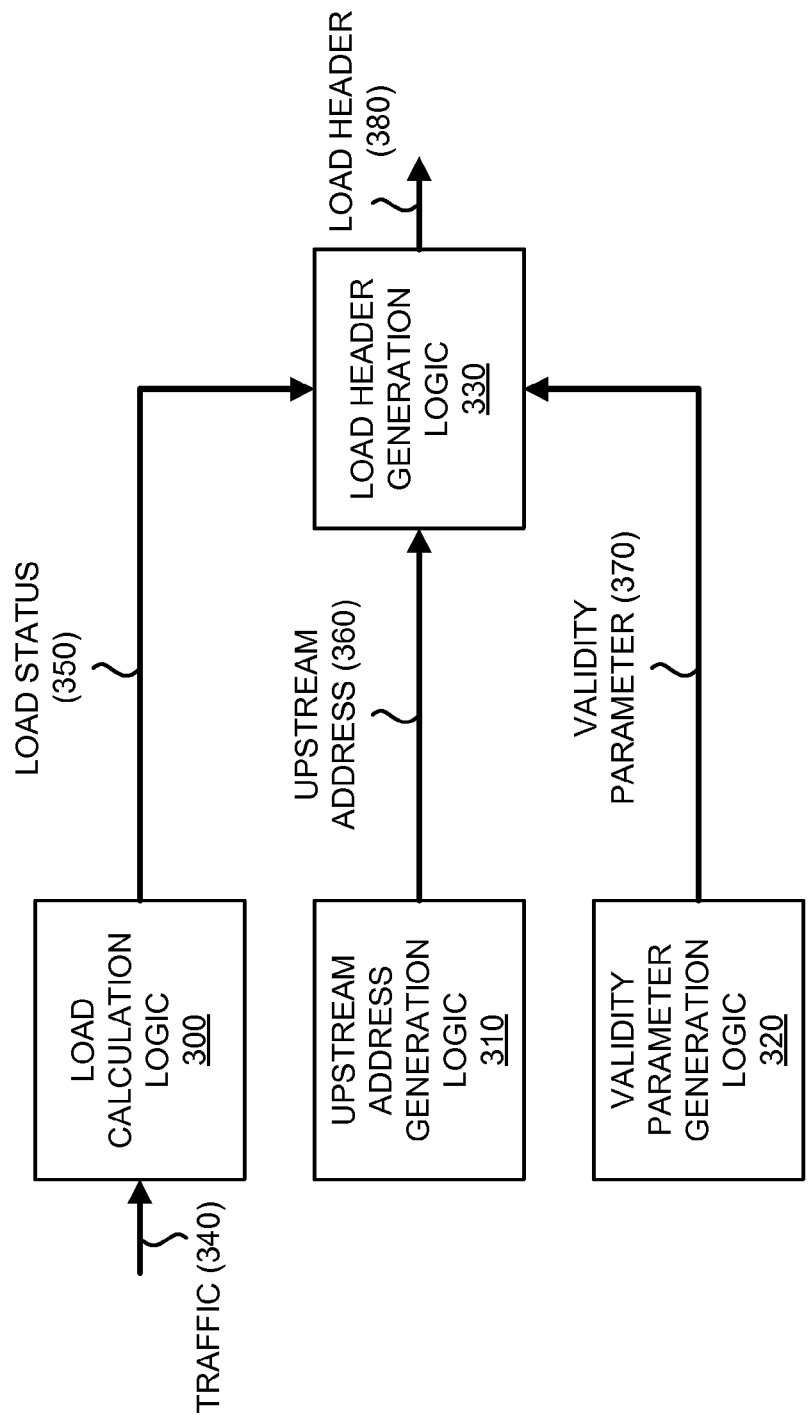
FIG. 3 depicts a diagram of exemplary functional components of the downstream device of the network illustrated in FIG. 1.

FIG. 3 depicts a diagram of exemplary functional components of downstream device 110. As illustrated, downstream device 110 may include load calculation logic 300, upstream address generation logic 310, validity parameter generation logic 320, and/or load header generation logic 330. The functions described in FIG. 3 may be performed by one or more of the exemplary components of device 200 depicted in FIG. 2.

Downstream device 110 may provide load information to its upstream neighbors (e.g., upstream devices 120) in a timely manner. In one implementation, downstream device 110 may provide load information by inserting a load header (e.g., a load header field) into SIP responses (e.g., SIP responses 140) that it forwards and/or creates. The load header may include a variety of information (e.g., a current load status associated with downstream device 110).

Load calculation logic 300 may include any hardware and/or software based logic (e.g., implemented in processor 260) that may enable downstream device 110 to receive traffic 340 (e.g., traffic from upstream devices 120) via input ports 210, and to generate a load status 350 of downstream device 110 based on traffic 340. Load calculation logic 300 may generate load status 350 based on a variety of mechanisms for calculating load. For example, in one implementation, load calculation logic 300 may generate load status 350 based on traffic volume, in progress calls, processor occupancy, etc. In one example, load status 350 may range from a first (low) value (e.g., "0," which may indicate that downstream device 110 is idle, and thus has no load) to a second (high) value (e.g., "99," which may indicate that downstream device 110 is completely overloaded). Load calculation logic 300 may normalize load status 350 to reflect current SIP message processing resources of downstream device 110 (e.g., the ability of downstream device 110 to maintain a state of established calls). Load calculation logic 300 may provide load status 350 to load header generation logic 330.

Upstream address generation logic 310 may include any hardware and/or software based logic (e.g., implemented in processor 260) that may enable downstream device 110 to generate an upstream address 360 (or "target" parameter) of an upstream neighbor (e.g., an upstream device 120) of downstream device 110. In one implementation, upstream address generation logic 310 may generate upstream address 360 based on an address of an upstream neighbor contained in a topmost SIP VIA header of a received SIP message. Information in upstream address 360, when included in SIP response 140, may enable upstream devices 120 to determine if the load header (e.g., containing upstream address 360) should be processed or ignored. For example, upstream device 120 may compare upstream address 360, included in SIP response 140, to its own address, and may process the load header of the SIP response if they match. Upstream device 120 may ignore the load header included in SIP response 140 if upstream address 360 does not match the address of upstream device 120. The use of upstream address 360 within the load header of SIP response 140 may effectively enable hop-by-hop mitigation, and may restrict use of load status information to immediate upstream neighbors. Upstream address generation logic 310 may provide upstream address 360 to load header generation logic 330.

Validity parameter generation logic 320 may include any hardware and/or software based logic (e.g., implemented in processor 260) that may enable downstream device 110 to generate a validity parameter 370 that defines a time (e.g., in milliseconds) during which the load header may be considered valid (e.g., by upstream devices 120). In one exemplary implementation, validity parameter generation logic 320 may generate validity parameter 370 with a default value of "500" milliseconds. In other implementations, validity parameter generation logic 320 may vary the value of validity parameter 370 as a function of a load status of downstream device 110. For example, validity parameter generation logic 320 may update the value of validity parameter 370 more often if the load status of downstream device 110 varies quickly, and may update the value of validity parameter 370 less often if the load status of downstream device 110 is less time variable. Validity parameter generation logic 320 may provide validity parameter 370 to load header generation logic 330.

Load header generation logic 330 may include any hardware and/or software based logic (e.g., implemented in processor 260) that may enable downstream device 110 to receive load status 350, upstream address 360, and validity parameter 370, and generate a load header 380 that includes load status 350, upstream address 360, and validity parameter 370. Downstream device 110 may insert load header 380 into SIP responses (e.g., SIP responses 140) that it forwards and/or creates.

Although FIG. 3 shows exemplary functional components of downstream device 110, in other implementations, downstream device 110 may contain fewer, different, or additional functional components than depicted in FIG. 3. In still other implementations, one or more functional components of downstream device 110 may perform one or more other tasks described as being performed by one or more other functional components of downstream device 110.

Figure 4:
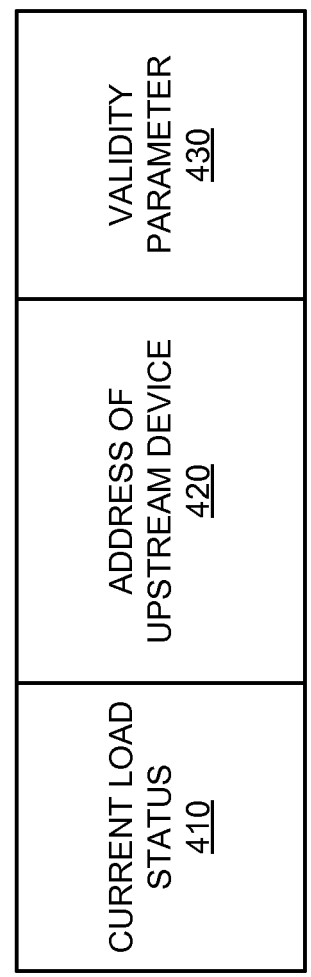
FIG. 4 illustrates a diagram of an exemplary load header capable of being generated by the downstream device of the network depicted in FIG. 1.

FIG. 4 illustrates a diagram of load header 380 capable of being generated by downstream device 110 (e.g., by load header generation logic 330 of downstream device 110). As depicted, load header 380 may include a current load status field 410, an address of upstream device field 420, and a validity parameter field 430.

Current load status field 410 may include information associated with a load status (e.g., load status 350) of downstream device 110. For example, in one implementation, current load status field 410 may include value in a range from a first (low) value (e.g., "0," which may indicate that downstream device 110 is idle, and thus has no load) to a second (high) value (e.g., "99," which may indicate that downstream device 110 is completely overloaded).

Address of upstream device field 420 may include information associated with an address (e.g., upstream address 360) of an upstream neighbor (e.g., upstream devices 120) of downstream device 110. For example, in one implementation, address of upstream device field 420 may include an address of an upstream neighbor found in a topmost SIP VIA header of a SIP message provided by the upstream neighbor.

Validity parameter field 430 may include information associated with a validity parameter (e.g., validity parameter 370) that defines a time (e.g., in milliseconds) during which load header 380 may be considered valid by upstream devices 120. In one exemplary implementation, validity parameter field 430 may include a default value of "500" milliseconds. In other implementations, validity parameter field 430 may include a value that varies as a function of a load status of downstream device 110.

Although FIG. 4 shows exemplary fields of load header 380, in other implementations, load header 380 may contain the same fields in a different order, or fewer, different, or additional fields than depicted in FIG. 4.

Figure 5:
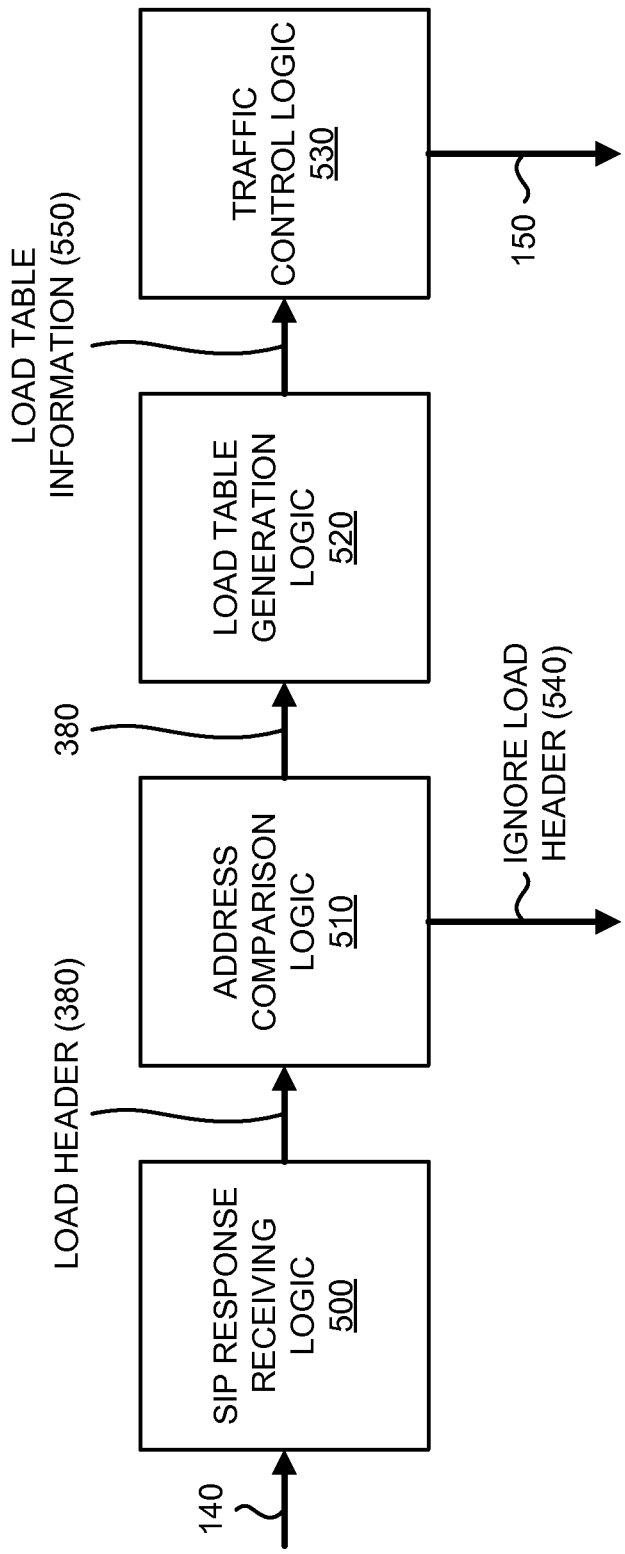
FIG. 5 depicts a diagram of exemplary functional components of the upstream devices of the network depicted in FIG. 1.

FIG. 5 depicts a diagram of exemplary functional components of one or more of upstream devices 120. As illustrated, upstream devices 120 may include SIP response receiving logic 500, address comparison logic 510, load table generation logic 520, and traffic control logic 530. The functions described in FIG. 5 may be performed by one or more of the exemplary components of device 200 depicted in FIG. 2.

SIP response receiving logic 500 may include any hardware and/or software based logic (e.g., implemented in processor 260) that may enable upstream device 120 to receive one or more SIP responses 140 that include load information (e.g., load header 380) associated with downstream device 110, and to remove or copy load headers from SIP responses 140 before forwarding SIP responses 140. For example, in one implementation, SIP response receiving logic 500 may remove load header 380 from SIP responses 140, and may provide load header 380 to address comparison logic 510.

Address comparison logic 510 may include any hardware and/or software based logic (e.g., implemented in processor 260) that receives load header 380, and determines if load header 380 should be processed or ignored. For example, in one implementation, address comparison logic 510 may compare address of upstream device field 420 (e.g., provided in load header 380) to its own address (e.g., address upstream device 120), and may process load header 380 if address of upstream device field 420 matches its own address. Address comparison logic 510 may permit upstream device 120 to ignore load header 380 (e.g., as indicated by reference number 540) if address of upstream device field 420 does not match the address of upstream device 120. If load header 380 is to be processed, address comparison logic 510 may provide load header 380 to load table generation logic 520.

Load table generation logic 520 may include any hardware and/or software based logic (e.g., implemented in processor 260) that receives load header 380, and generates a load table that includes load table information 550. For example, in one implementation, load table generation logic 520 may store information received in load headers (e.g., load header 380) provided by downstream device 110. Each time upstream device 120 receives a SIP response (e.g., SIP responses 140) with a load header to be processed (e.g., load header 380) from downstream device 110, such that the load header passes address comparison logic 510 and is forwarded to load table generation logic 520, load table generation logic 520 may overwrite current information provided in the load table with the newly received information provided in the load header. The load table may include a variety of load table information 550, such as an address of a downstream device from which the load header was received, a time when the load header was received, a load status value, an expiration time, etc. Further details of the load table are provided below in connection with, for example, FIG. 6. Load table generation logic 520 may provide load table information 550 to traffic control logic 530.

Traffic control logic 530 may include any hardware and/or software based logic (e.g., implemented in processor 260) that receives load table information 550, determines a limit on an amount of traffic to be sent to downstream device 110 based on load table information 550, and sends available traffic 150 to downstream device 110, subject to the limit. Further details of traffic control logic 530 are provided below in connection with, for example, FIG. 7.

Although FIG. 5 shows exemplary functional components of upstream devices 120, in other implementations, upstream devices 120 may contain fewer, different, or additional functional components than depicted in FIG. 5. In still other implementations, one or more functional components of upstream devices 120 may perform one or more other tasks described as being performed by one or more other functional components of upstream devices 120.

Figure 6:
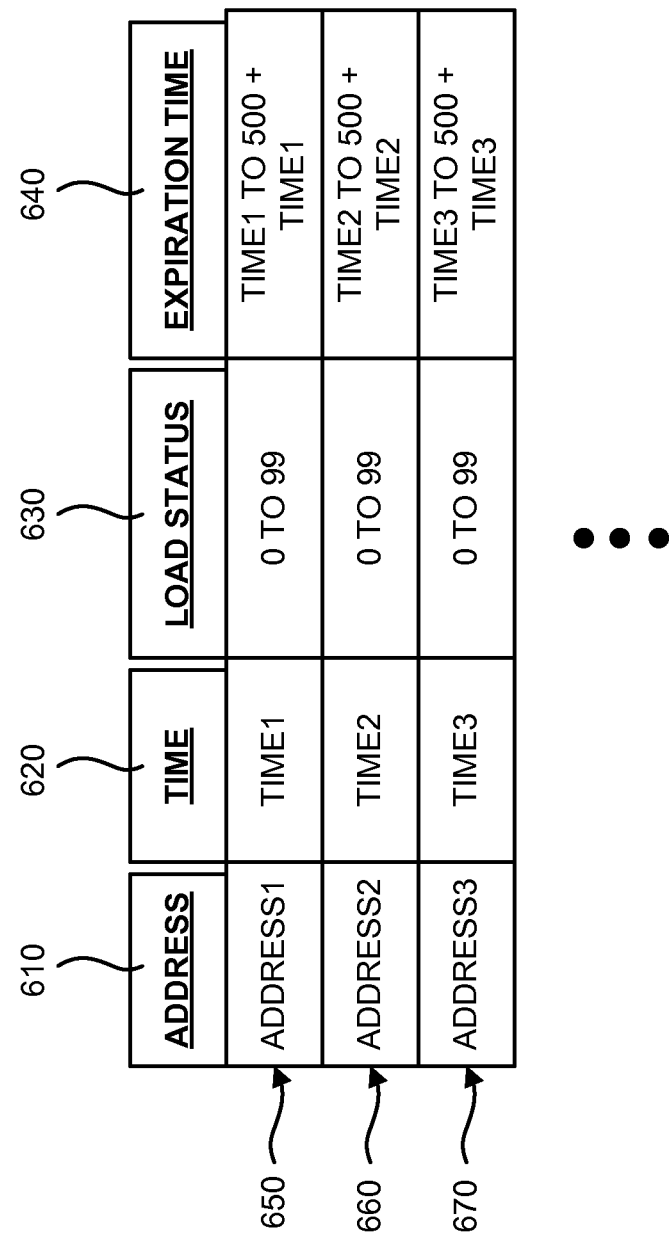
FIG. 6 illustrates a diagram of an exemplary portion of a load table capable of being generated and/or maintained by the upstream devices of the network depicted in FIG. 1.

FIG. 6 illustrates a diagram of an exemplary portion 600 of a load table capable of being generated and/or maintained by upstream devices 120. In one implementation, load table portion 600 may be stored in a storage device (e.g., memory 270) associated with upstream devices 120. In other implementations, load table portion 600 may be stored in a storage device associated with another device that may be accessed by upstream devices 120 (e.g., via communication interface 280). As shown in FIG. 6, load table portion 600 may include an address field 610, a time field 620, a load status field 630, an expiration time field 640, and one or more entries 650-670 associated with fields 610-640. In one implementation, load table portion 600 may be populated, either by load table generation logic 520 or by traffic control logic 530, using load table information 550.

Address field 610 may include an address of a downstream device (e.g., downstream device 110) from which a load header was received. For example, first entry 650 may include an address (e.g., "ADDRESS1") of a first downstream device, second entry 660 may include an address (e.g., "ADDRESS2") of a second downstream device, and third entry 670 may include an address (e.g., "ADDRESS3") of a third downstream device.

Time field 620 may include a time when a load header was received. For example, first entry 650 may include a first time (e.g., "TIME1") associated with receipt of a first load header (e.g., from downstream device 110 with address "ADDRESS1"), second entry 660 may include a second time (e.g., "TIME2") associated with receipt of a second load header, and third entry 670 may include a third time (e.g., "TIME3") associated with receipt of a third load header.

Load status field 630 may include a load status value (e.g., current load status 410) associated with the downstream device identified in address field 610. For example, in one implementation, load status field 630 may include a load status value ranging from a first (low) value (e.g., "0," which may indicate that a downstream device is idle, and thus not congested) to a second (high) value (e.g., "99," which may indicate that a downstream device is completely overloaded).

Expiration time field 640 may include an expiration time associated with the downstream device identified in corresponding address field 610. In one implementation, the expiration time may be calculated by adding a validity parameter value (e.g., validity parameter 370) of a load header (e.g., load header 380) to the time provided in time field 620 (e.g., populated as described above). The validity parameter value may define a duration from a time of receipt (e.g., in milliseconds) during which the load header may be considered valid (e.g., by upstream devices 120). In one example, the validity parameter value may include a default value of "500" milliseconds. As shown in FIG. 6, first entry 650 may include a first expiration time ranging from the first time (e.g., "TIME1") to a sum of the first time and a default value (e.g., "500" milliseconds), second entry 660 may include a second expiration time ranging from the second time (e.g., "TIME2") to a sum of the second time and a default value (e.g., "500" milliseconds), and third entry 670 may include a third expiration time ranging from the third time (e.g., "TIME3") to a sum of the third time and a default value (e.g., "500" milliseconds).

Although FIG. 6 shows exemplary fields of load table portion 600, in other implementations, load table portion 600 may contain fewer, different, or additional fields than depicted in FIG. 6.

Figure 7:
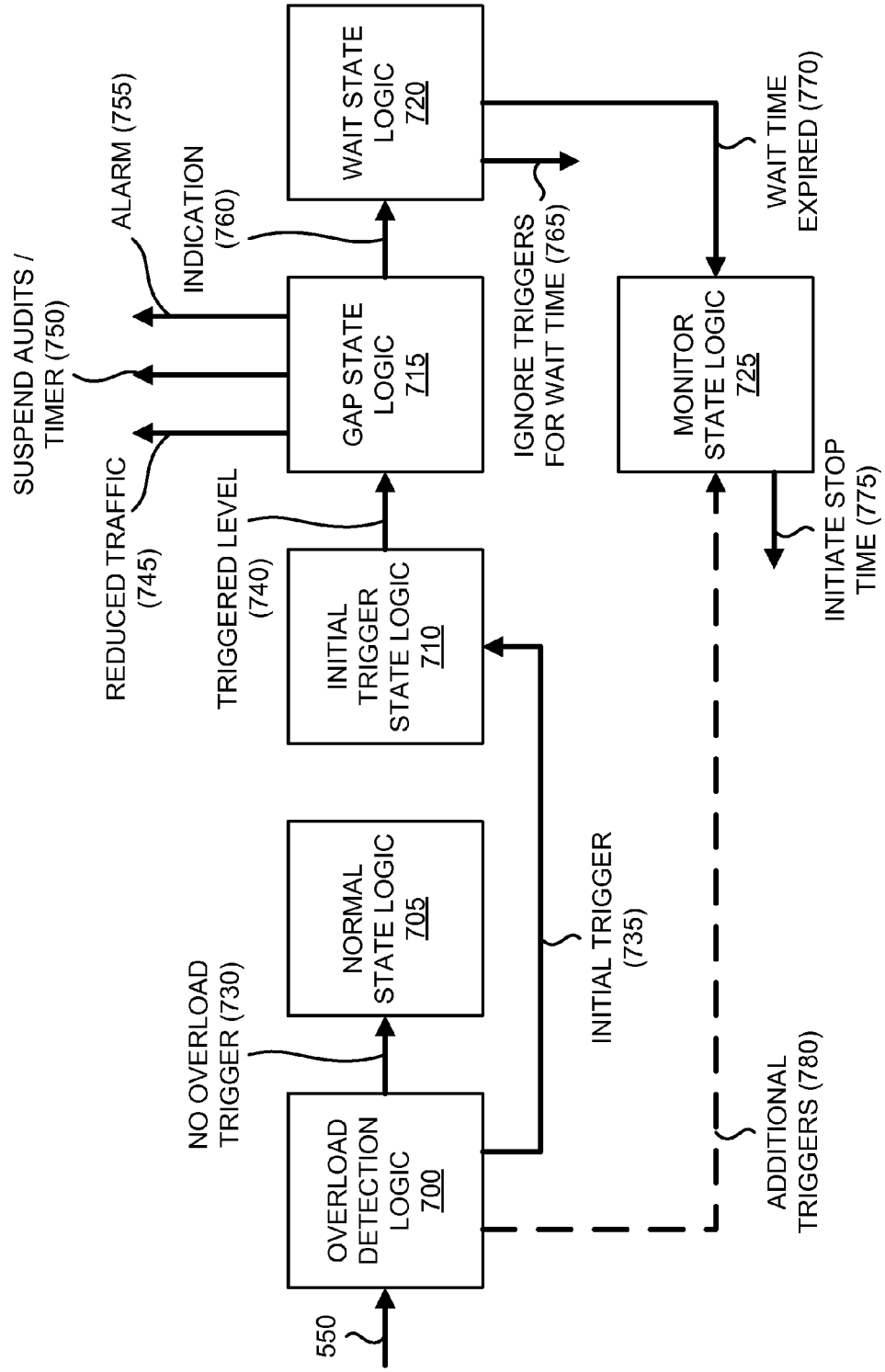
FIG. 7 depicts a diagram of exemplary functional components of traffic control logic of the upstream devices illustrated in FIG. 5.

FIG. 7 depicts a diagram of exemplary functional components of traffic control logic 530 of upstream devices 120. As illustrated, traffic control logic 530 may include overload detection logic 700, normal state logic 705, initial trigger state logic 710, gap state logic 715, wait state logic 720, and monitor state logic 725. The functions described in FIG. 7 may be performed by one or more of the exemplary components of device 200 depicted in FIG. 2.

Traffic control logic 530 (e.g., via logic 700-725) of an upstream device 120 may implement a process for throttling or reducing traffic (e.g., signaling load) sent to an overloaded downstream device 110. In one exemplary implementation, when traffic control logic 530 detects an overload situation in downstream device 110 (e.g., by means of an overload trigger provided via load header 380), the process implemented by traffic control logic 530 may take immediate action to reduce an amount of traffic being sent to downstream device 110. The process may provide a configurable step-wise decrement of the amount of traffic. As additional overload triggers are received (e.g., signaling increased congestion), the process may activate subsequent steps that may be configured to provide more aggressive actions and/or settings. As overload triggers lessen, stop, and/or reflect lower loads, the process may back down through any prior triggered levels and return traffic handling to a normal/pre-overload state in a controlled fashion. Thus, the process may take defined actions on a per-step and a per-downstream device basis. The process implemented by traffic control logic 530, as described herein, is exemplary. In other implementations, traffic control logic 530 of an upstream device 120 may implement one or more other processes for throttling or reducing traffic sent to an overloaded downstream device 110.

The exemplary process implemented by traffic control logic 530 may utilize a variety of parameters. For example, in one implementation, the process may utilize an "OverloadTrigger" parameter, a "TriggeredLevel" parameter, an "N" parameter, a "WaitTime" parameter, a "StopTime" parameter, a "CallGapX %" parameter, and a "SuspendCallAudit" parameter. Such parameters may permit the process to throttle or reduce traffic (e.g., signaling load) sent from upstream devices 120 to an overloaded downstream device 110.

The OverloadTrigger parameter may include a per-downstream device pointer to a set of other configurable parameters and/or actions to apply based on a specific parameter value (e.g., the TriggeredLevel parameter). The TriggeredLevel parameter may include a per-downstream device pointer to a set of other configurable parameters and/or actions that upstream devices 120 may apply based on a specific TriggeredLevel value. For example, the TriggeredLevel parameter may be automatically incremented by a value (e.g., "1") based on reception of the OverloadTrigger parameter during a non-waiting time. The TriggeredLevel parameter may be automatically decremented by a value (e.g., "1") based on reaching a parameter value (e.g., the StopTime parameter). Thus, the TriggeredLevel parameter may increment from, and decrement back to, a normal, no-action, default state value (e.g., a value of "0"). The TriggeredLevel parameter may be incremented to a maximum number of overload levels (e.g., specified by the N parameter) configured for a downstream device (e.g., downstream device 110). If the N parameter level is reached, further overload triggers during a non-waiting time may cause upstream devices 120 to maintain the level at the N parameter level and to re-initiate N parameter level actions (e.g., alarms, etc.).

The N parameter may support a number of steps to permit gradual reduction in and recovery from overload conditions via a number of overload levels (e.g., an N parameter that equals ten may permit ten different overload levels to be defined). The N parameter may be configurable on a per-downstream device basis to permit upstream devices 120 to define how many overload levels may be provisioned for a given downstream device.

The WaitTime parameter may define a guard time (e.g., in seconds) that may be started when a new overload level has been triggered and associated actions have been applied (e.g., by upstream devices 120). The WaitTime parameter may allow time for the associated actions to take affect before upstream devices 120 monitor for new overload triggers. If the time associated with the WaitTime parameter expires, the StopTime parameter may be activated. The WaitTime parameter may be set on a per-downstream device basis and/or a per-TriggeredLevel parameter basis.

The StopTime parameter may include a time interval (e.g., in seconds) after the WaitTime parameter expires that defines a monitoring interval where the TriggeredLevel parameter may be incremented to a next overload level or decremented to a previous overload level based on received overload triggers. If the StopTime parameter expires, this may indicate that no additional triggers have been received (e.g., from downstream device 110), and that downstream device 110 may be experiencing a severe overload problem. In one implementation, receipt of triggers during the time interval associated with the StopTime parameter may cause escalation to a next overload level (or de-escalation to a previous overload level), and abandonment of the StopTime parameter for a current step. The StopTime parameter may be set on a per-downstream device basis and/or a per-TriggeredLevel parameter basis.

The CallGapX % parameter may define a percentage of reduction to be applied to traffic destined for a specific downstream device (e.g., downstream device 110). The CallGapX % parameter may define a configurable range of reduction percentages (e.g., a range from 1% to 99%). In one implementation, a maximum reduction percentage for the CallGapX % parameter may be set less than 100% so that (e.g., for recovery purposes) some calls may be attempted to a specific downstream device (e.g., downstream device 110). The CallGapX % parameter may be set on a per-downstream device basis and/or a per-TriggeredLevel parameter basis, and may provide a vehicle for load information (e.g., load information 550) to enter the process.

The SuspendCallAudit parameter may include a Yes/No Boolean value that indicates whether initiation of new call audits (e.g., SIP-based INFO or Session Timer call audits) may be suspended for a specific overload level. New call audits may be suspended during an overload condition. This may not be an issue for INFO type call audits because they may repeat over existing calls, once the overload condition subsides, and may identify suspended sessions. Session Timer call audits, however, may be set up on a per-call, one-time basis. The SuspendCallAudit parameter may identify such suspended calls, and, once the overload condition subsides, may initiate and/or re-INVITE a Session Timer request for the suspended calls. The SuspendCallAudit parameter may be set on a per-downstream device basis and/or a per-TriggeredLevel parameter basis.

Overload detection logic 700 may include any hardware and/or software based logic (e.g., implemented in processor 260) that enables upstream devices 120 to generate load table information 550, and to determine if an initial overload trigger is received from downstream device 110 (e.g., via load table information 550). The initial overload trigger may be configurable and may be defined by a load status value (e.g., provided in load status field 630 of load table portion 600). For example, in one implementation, the initial overload trigger may be greater than a specific load status value (e.g. a load status value of "60"). In another implementation, the initial overload trigger may be in a range of load status values (e.g., a range from "60" to "70"). If no initial overload trigger is received from downstream device 110, overload detection logic 700 may provide an indication 730 of no initial overload trigger to normal state logic 705. If an initial overload trigger is received from downstream device 110, overload detection logic 700 may provide an initial trigger 735 to initial trigger state logic 710. In one exemplary implementation, overload detection logic 700 may generate initial trigger 735 using a parameter (e.g., the OverloadTrigger parameter).

Normal state logic 705 may include any hardware and/or software based logic (e.g., implemented in processor 260) that receives no initial overload trigger indication 730, and maintains upstream devices 120 in a normal (i.e., pre-overload) state. For example, normal state logic 705 may permit upstream devices 120 to send an amount of traffic that is typically sent by upstream devices 120 when overload conditions are not present. Normal state logic 705 may set a parameter (e.g., the TriggeredLevel parameter) to a normal state value (e.g., a value of "0").

Initial trigger state logic 710 may include any hardware and/or software based logic (e.g., implemented in processor 260) that receives initial trigger 735 (e.g., during a normal state), and increments a triggered level parameter 740 (e.g., the TriggeredLevel parameter) by a step (e.g., by a value of "1") based on initial trigger 735. Initial trigger state logic 710 may provide triggered level parameter 740 to gap state logic 715. If triggered level parameter 740 equals a normal state value (e.g., a value of "0") upstream devices 120 may return to a normal state.

Gap state logic 715 may include any hardware and/or software based logic (e.g., implemented in processor 260) that enables upstream devices 120 to generate reduced traffic 745, to suspend upstream device-initiated call audits and/or session timers 750 (e.g., if provisioned by the SuspendCallAudit parameter), and to initiate an alarm 755 based on triggered level 740. Reduced traffic 745 may include traffic (e.g., provided to downstream device 110) that may be reduced based on the reduction percentage specified by the CallGapX % parameter. Alarm 755 may be generated at each step of the process until downstream device 110 returns to a normal state condition. Gap state logic 715 may provide an indication 760 that actions (e.g., reduced traffic 745, suspend audits/timer 750, and/or alarm 755) have been applied. The provisioned actions for each step of the process may reduce processing and messaging for downstream device 110, and may permit downstream device 110 to recover and/or not be overwhelmed after an overload condition abates.

Wait state logic 720 may include any hardware and/or software based logic (e.g., implemented in processor 260) that receives indication 760 from gap state logic 715, initiates a wait time (e.g., via the WaitTime parameter), and instructs an upstream device 120 to ignore any received overload triggers during the wait time, as indicated by reference number 765. The wait time may permit the actions generated by gap state logic 715 to take affect and provide some benefit to downstream device 110. If the wait time expires, wait state logic 720 may provide an indication 770 to monitor state logic 725 that the wait time expired.

In one exemplary implementation, if a SIP "5xx" response code defined for overload control (e.g., a "503" (Service Unavailable) response code or a "507" (Server Overload) response code) is received from downstream device 110, wait state logic 720 may set the TriggeredLevel parameter equal to the N parameter and may terminate the WaitTime parameter. The SIP "5xx" response code may indicate that downstream device 110 is already overloaded, and wait state logic 720 may implement the aforementioned actions to correct the overload condition.

Monitor state logic 725 may include any hardware and/or software based logic (e.g., implemented in processor 260) that receives the wait time expired indication 770 from wait state logic 720, and initiates a time interval (e.g., via the StopTime parameter), as indicated by reference number 775. Monitor state logic 725 may monitor additional overload triggers during the time interval specified by the StopTime parameter, and may enable upstream devices 120 to ascertain if the applied actions (e.g., provided by gap state logic 715) reduce an overload condition occurring in downstream device 110. Monitor state logic 725 may or may not receive additional triggers 780, via overload detection logic 700, during the time interval specified by the StopTime parameter. Additional triggers 780 may include a load status of downstream device 110.

If a load status update for downstream device 110 is received (e.g., via additional triggers 780) by monitor state logic 725 during the time interval specified by the StopTime parameter and the load status is less than or equal to a specified value (e.g., a value "trigger−K1," where K1 may be a configurable value between "1" and "10"), monitor state logic 725 may determine that the applied actions (e.g., provided by gap state logic 715) have been successful. If the applied actions have been successful, the process may decrement the TriggeredLevel parameter by one, and gap state logic 715 may adjust the applied actions based on the decremented TriggeredLevel parameter.

If the time interval specified by the StopTime parameter expires without a load status of downstream device 110 being received (e.g., via additional triggers 780) by monitor state logic 725, monitor state logic 725 may determine that the success of the applied actions (e.g., provided by gap state logic 715) is unknown. If success of the applied actions is unknown, the process may increment the TriggeredLevel parameter by a configurable integer (U) that is greater than or equal to zero and less than or equal to the N parameter (i.e., $0 \leq$ (current level+U) $\leq N$), and gap state logic 715 may adjust the applied actions based on the incremented TriggeredLevel parameter. If the time interval specified by the StopTime parameter expires without an updated load status of downstream device 110 being received, downstream device 110 may be so overloaded that it cannot process responses.

If an updated load status of downstream device 110 is received (e.g., via additional triggers 780) by monitor state logic 725 during the time interval specified by the StopTime parameter and the load status is greater than a specified value (e.g., a value "trigger+K2," where K2 may be a configurable value between "1" and "10"), monitor state logic 725 may determine that the applied actions (e.g., provided by gap state logic 715) have been unsuccessful. If the applied actions have been unsuccessful, the process may increment the TriggeredLevel parameter by one (unless the TriggeredLevel parameter is equal to the value of the N parameter), and gap state logic 715 may adjust the applied actions based on the incremented TriggeredLevel parameter. If the situation does not improve and additional triggers 780 are received by monitor state logic 725, the TriggeredLevel parameter may eventually rise to equal the value of the N parameter. In this case, the process may not increment the TriggeredLevel parameter any further. However, gap state logic 715 may adjust the applied actions based on the value of the N parameter.

If an updated load status of downstream device 110 is received (e.g., via additional triggers 780) by monitor state logic 725 during the time interval specified by the StopTime parameter and the load status is greater than another specified value (e.g., value "trigger−K1") and less than or equal to a specified value (e.g., value "trigger+K2"), gap state logic 715 may continue to mandate the already-applied actions.

Although FIG. 7 shows exemplary functional components of traffic control logic 530, in other implementations, traffic control logic 530 may contain fewer, different, or additional functional components than depicted in FIG. 7. In still other implementations, one or more functional components of traffic control logic 530 may perform one or more other tasks described as being performed by one or more other functional components of traffic control logic 530.

FIGS. 8-12 depict a flow chart of an exemplary process 800 for reducing traffic sent from upstream devices (e.g., upstream devices 120) to an overloaded downstream device (e.g., downstream device 110), according to implementations described herein. In one implementation, process 800 may be performed by one or more of upstream devices 120. In another implementation, some or all of process 800 may be performed by another device or group of devices, including or excluding upstream devices 120.

Figure 8:
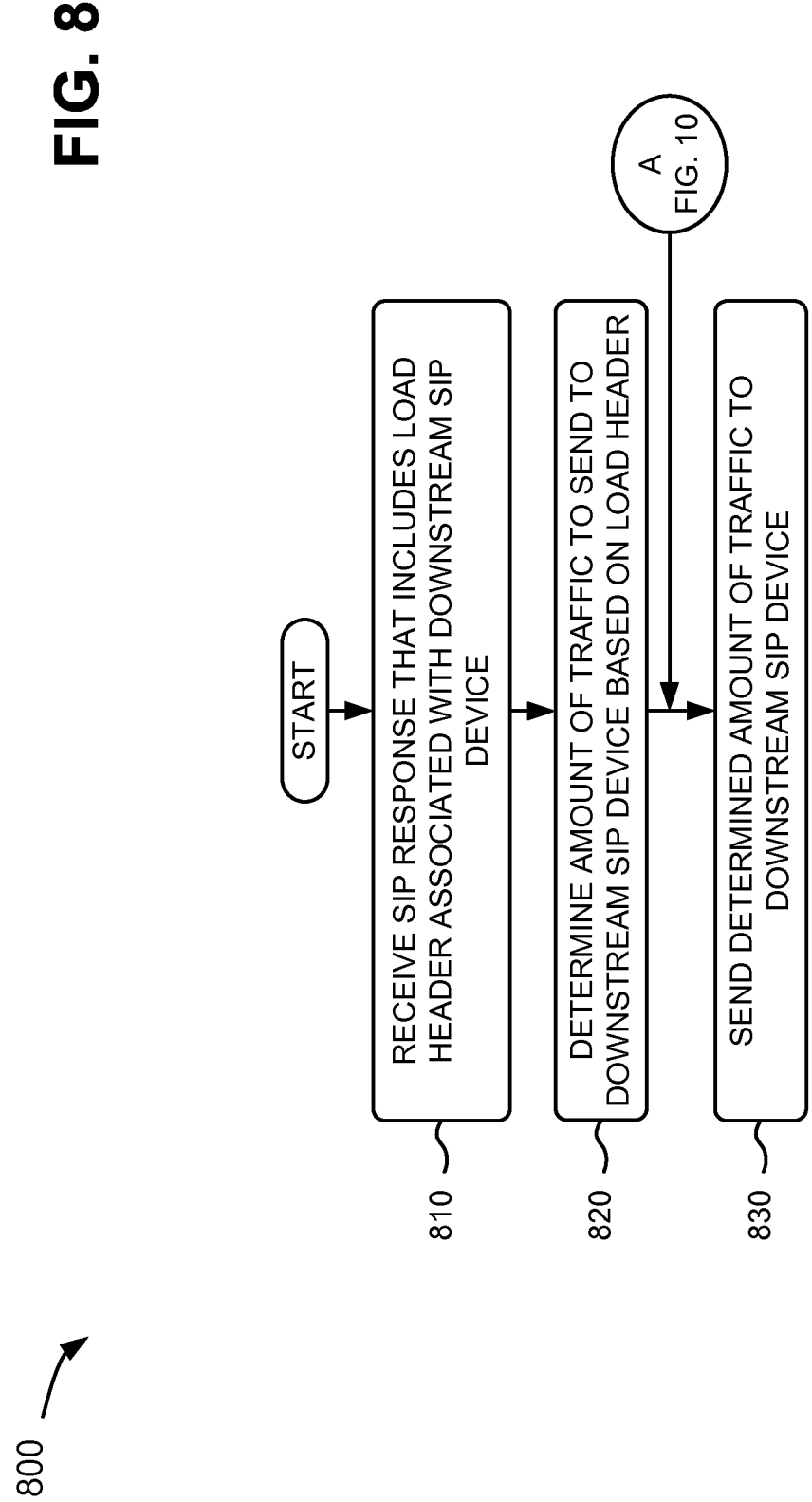

As illustrated in FIG. 8, process 800 may begin with receipt of a Session Initiation Protocol (SIP) response that includes a load header associated with a downstream SIP device (block 810), and determination of an amount (e.g., a maximum amount) of traffic to be sent to the downstream SIP device based on the load header (block 820). For example, in implementations described above in connection with FIG. 5, SIP response receiving logic 500 of upstream devices 120 may receive one or more SIP responses 140 that include load information (e.g., load header 380) associated with downstream device 110, and may remove load headers from SIP responses 140 before forwarding SIP responses 140. Load table generation logic 520 of upstream devices 120 may receive load header 380, and may update a load table based on load table information 550. Traffic control logic 530 of upstream devices 120 may receive load table information 550, and may determine a limit on an amount of traffic to send to downstream device 110 based on load table information 550.

As further shown in FIG. 8, up to the determined amount of traffic may be sent to the downstream SIP device (block 830). For example, in implementations described above in connection with FIG. 5, traffic control logic 530 of upstream devices 120 may send up to the determined amount of traffic 150 to downstream device 110, based on load table information 550.

Figure 9:
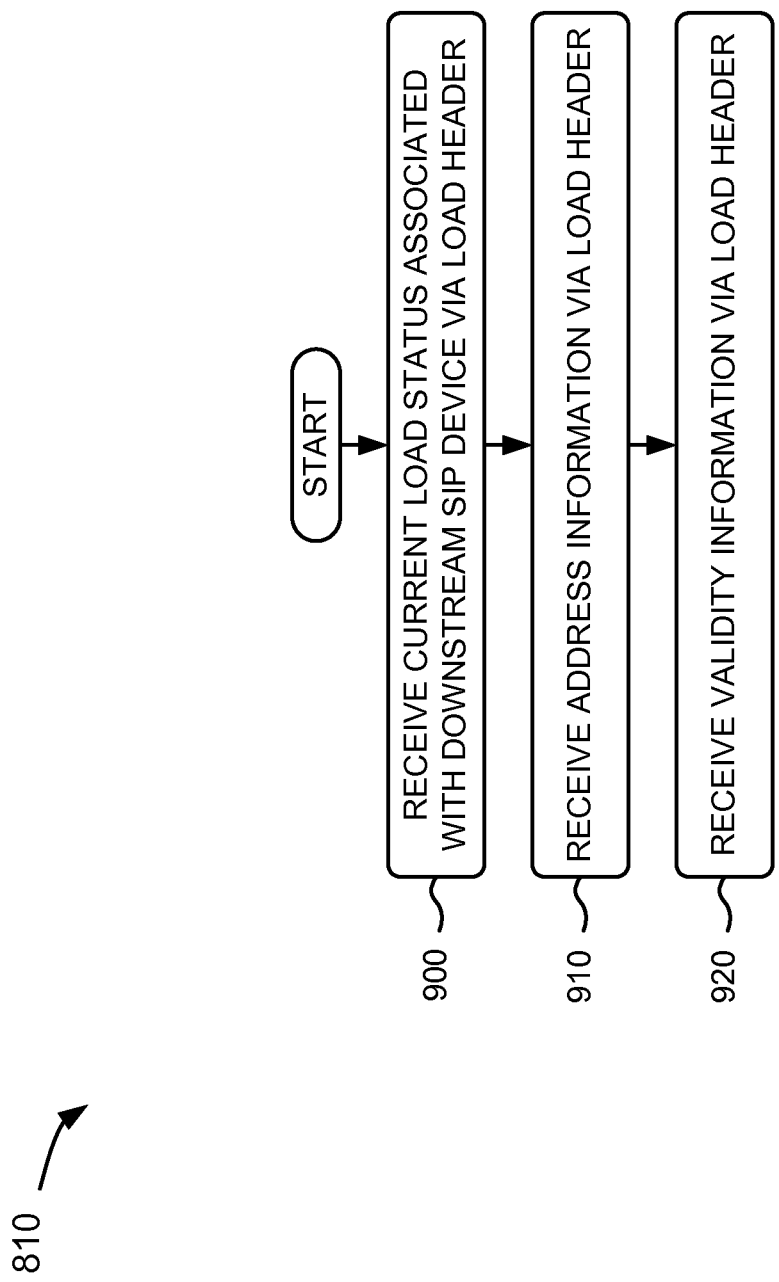

Process block 810 may include the process blocks depicted in FIG. 9. As shown in FIG. 9, process block 810 may include receiving a current load status associated with the downstream SIP device via the load header (block 900), receiving address information via the load header (block 910), and/or receiving validity information via the load header (block 920). For example, in implementations described above in connection with FIGS. 4 and 5, load header 380 may include current load status field 410, address of upstream device field 420, and validity parameter field 430. Current load status field 410 may include information associated with a load status (e.g., load status 350) of downstream device 110. Address of upstream device field 420 may include information associated with an address (e.g., upstream address 360) of an upstream neighbor (e.g., upstream devices 120) of downstream device 110. Validity parameter field 430 may include information associated with a validity parameter (e.g., validity parameter 370) that defines an interval (e.g., in milliseconds) for which the received load header 380 may be considered valid (e.g., by upstream devices 120). SIP response receiving logic 500 of upstream devices 120 may receive one or more SIP responses 140 that include load information (e.g., load header 380).

Figure 10:
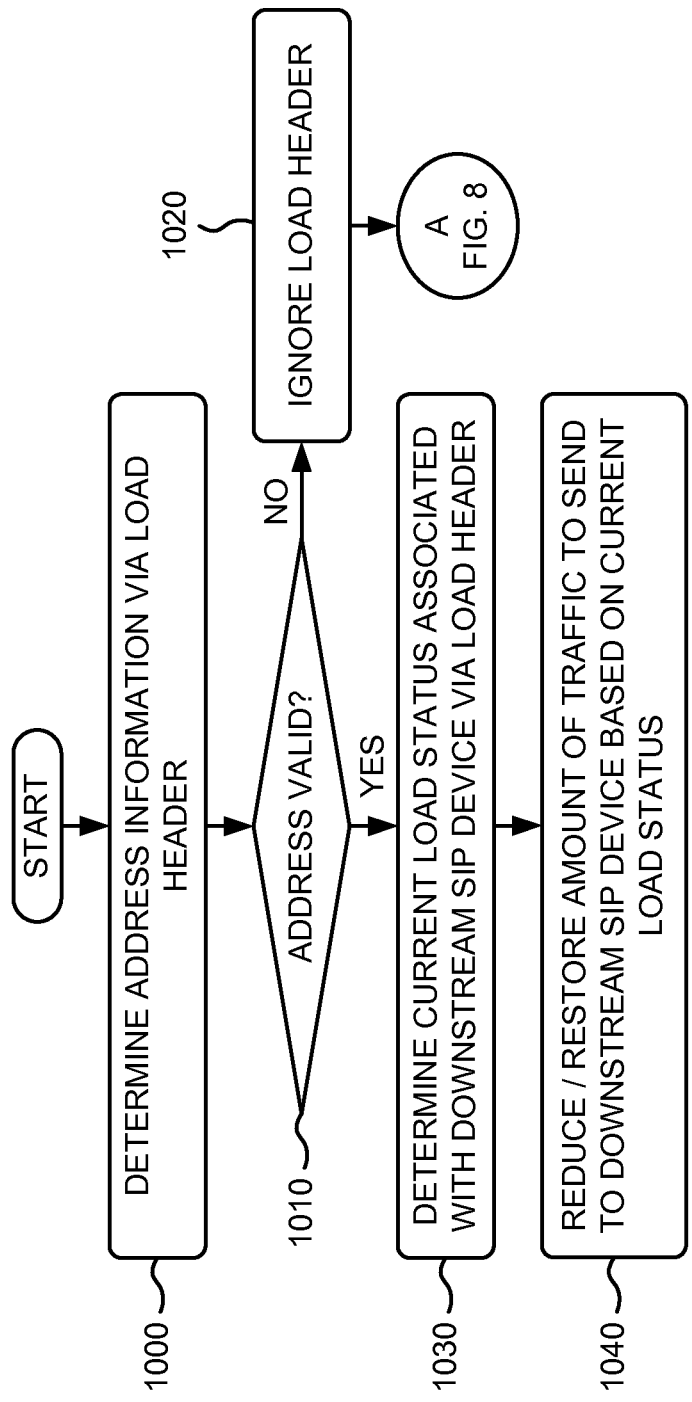

Process block 820 may include the process blocks depicted in FIG. 10. As shown in FIG. 10, process block 820 may include determining address information via the load header (block 1000), and determining if the address information is valid (block 1010). If the address information is not valid (block 1010—NO), the load header may be ignored (block 1020) and process block 820 may proceed to "A" as shown in FIG. 8. For example, in implementations described above in connection with FIG. 5, address comparison logic 510 of upstream devices 120 may receive load header 380, and may determine if load header 380 should be processed or ignored. In one example, address comparison logic 510 may permit upstream device 120 to ignore load header 380 (e.g., as indicated by reference number 540) if address of upstream device field 420 (e.g., provided by load header 380) does not match the address of upstream device 120.

Returning to FIG. 10, if the address information is valid (block 1010—YES), a current load status associated with the downstream SIP device may be determined via the load header (block 1030), and the amount of traffic to send to the downstream SIP device may be reduced and/or restored based on the current load status (block 1040). For example, in implementations described above in connection with FIG. 5, address comparison logic 510 of upstream devices 120 may permit upstream device 120 to process load header 380 if address of upstream device field 420 (e.g., provided by load header 380) matches the address of upstream device 120. If load header 380 is to be processed, address comparison logic 510 may provide load header 380 to load table generation logic 520 for processing. Traffic control logic 530 of upstream devices 120 may receive load table information 550, which may include a current load status provided by load header 380, and may reduce and/or restore an amount of traffic to send to downstream device 110 based on load table information 550.

Alternatively and/or additionally, process block 820 may include the process blocks depicted in FIG. 11. As shown in FIG. 11, process block 820 may include determining if an initial trigger is received from downstream device 110 (block 1100). If the initial trigger is not received (block 1100—NO), the amount of traffic provided to the downstream SIP device may be maintained (block 1110). If the initial trigger is received (block 1100—YES), a trigger level may be incremented (block 1120). For example, in implementations described above in connection with FIG. 7, overload detection logic 700 of upstream devices 120 may receive load table information 550, and may determine if an initial overload trigger is received from downstream device 110 (e.g., via load table information 550). If no initial overload trigger is received from downstream device 110, overload detection logic 700 may provide an indication 730 of no initial overload trigger to normal state logic 705. If an initial overload trigger is received from downstream device 110, overload detection logic 700 may provide an initial trigger 735 to initial trigger state logic 710. Normal state logic 705 of upstream devices 120 may receive indication 730 of no initial overload trigger, and may maintain upstream devices 120 in a normal (i.e., pre-overload) state. Initial trigger state logic 710 of upstream devices 120 may receive initial trigger 735 (e.g., during a normal state), and may increment a triggered level parameter 740 (e.g., the TriggeredLevel parameter) by a step (e.g., by a value of "1") based on initial trigger 735.

As further shown in FIG. 11, the permissible amount of traffic may be reduced by a specific amount (block 1130), initiated call audits and/or a session timer may be suspended (block 1140), and an alarm may be initiated (block 1150). For example, in implementations described above in connection with FIG. 7, gap state logic 715 of upstream devices 120 may reduce the transmitted traffic 745, may suspend upstream device-initiated call audits and/or session timers 750 (e.g., if provisioned by the SuspendCallAudit parameter), and may initiate an alarm 755 based on triggered level 740. Reduced traffic 745 may include traffic (e.g., provided to downstream device 110) that may be reduced based on the reduction percentage specified by the CallGapX % parameter. Alarm 755 may be generated at each step of the process until downstream device 110 returns to a normal state condition.

Returning to FIG. 11, an additional trigger may be ignored for a wait time (block 1160), and, when the wait time expires, it may be determined whether the reductions in the amount of traffic were successful during a monitoring period (block 1170). For example, in implementations described above in connection with FIG. 7, wait state logic 720 of upstream devices 120 may receive indication 760 from gap state logic 715, may initiate a wait time (e.g., via the WaitTime parameter), and may instruct upstream devices 120 to ignore any received overload triggers during the wait time, as indicated by reference number 765. If the wait time expires, wait state logic 720 may provide an indication 770 that the wait time expired to monitor state logic 725. Monitor state logic 725 of upstream devices 120 may receive indication 770 that the wait time expired from wait state logic 720, and may initiate a time interval (e.g., via the StopTime parameter), as indicated by reference number 775. Monitor state logic 725 may monitor additional overload triggers during the time interval specified by the StopTime parameter, and may enable upstream devices 120 to ascertain whether the overload condition occurring in downstream device 110 has been improved or resolved.

Process block 1170 may include the process blocks depicted in FIG. 12. As shown in FIG. 12, process block 1170 may include increasing the amount of traffic by a specific amount when a load status received during the monitoring period is less than or equal to a first threshold (block 1200). For example, in implementations described above in connection with FIG. 7, if a load status of downstream device 110 is received (e.g., via additional triggers 780) by monitor state logic 725 of upstream devices 120 during the time interval specified by the StopTime parameter and the load status is less than or equal to a specified value (e.g., a value "trigger−K1," where K1 may be a configurable value between "1" and "10"), monitor state logic 725 may determine that the applied actions (e.g., provided by gap state logic 715) have been successful. If the applied actions have been successful, upstream devices 120 may increase the amount of traffic provided to downstream device 110 (e.g., by decrementing the TriggeredLevel parameter).

As further shown in FIG. 12, process block 1170 may include further reducing the amount of traffic by a specific amount when a load status is not received during the monitoring period (block 1210). For example, in implementations described above in connection with FIG. 7, if the time interval specified by the StopTime parameter expires without a load status of downstream device 110 being received (e.g., via additional triggers 780) by monitor state logic 725 of upstream devices 120, monitor state logic 725 may determine that the success of the applied actions (e.g., provided by gap state logic 715) is unknown. If success of the applied actions is unknown, upstream devices 120 may further reduce the amount of traffic provided to downstream device 110 (e.g., by incrementing the TriggeredLevel parameter).

Returning to FIG. 12, process block 1170 may include further reducing the threshold of sent traffic by a specific amount when a load status received during the monitoring period is greater than a second threshold (block 1220). For example, in implementations described above in connection with FIG. 7, if a load status of downstream device 110 is received (e.g., via additional triggers 780) by monitor state logic 725 of upstream devices 120 during the time interval specified by the StopTime parameter and the load status is greater than a specified value (e.g., a value "trigger+K2," where K2 may be a configurable value between "1" and "10"), monitor state logic 725 may determine that the applied actions (e.g., provided by gap state logic 715) have been unsuccessful. If the applied actions have been unsuccessful, upstream devices 120 may further reduce the amount of traffic provided to downstream device 110 (e.g., by incrementing the TriggeredLevel parameter).

As further shown in FIG. 12, process block 1170 may include maintaining the reduced threshold on the amount of traffic when a load status received during the monitoring period is between the first and second thresholds (block 1230). For example, in implementations described above in connection with FIG. 7, if a load status of downstream device 110 is received (e.g., via additional triggers 780) by monitor state logic 725 of upstream devices 120 during the time interval specified by the StopTime parameter and the load status is greater than a specified value (e.g., value "trigger−K1") and less than or equal to a specified value (e.g., value "trigger+K2"), gap state logic 715 of upstream devices 120 may leave its traffic reduction policies unchanged.

FIG. 13 depicts a flow chart of an exemplary process 1300 for reducing traffic sent from upstream devices (e.g., upstream devices 120) to an overloaded downstream device (e.g., downstream device 110), according to implementations described herein. In one implementation, process 1300 may be performed by downstream device 110. In another implementation, some or all of process 1300 may be performed by another device or group of devices, including or excluding downstream device 110.

As illustrated in FIG. 13, process 1300 may begin with generating a current load status (block 1310), generating address information associated with an upstream SIP device (block 1320), and generating validity information (block 1330). For example, in implementations described above in connection with FIG. 3, load calculation logic 300 of downstream device 110 may receive traffic 340 (e.g., traffic from upstream devices 120), and may generate load status 350 of downstream device 110 based on traffic 340. Upstream address generation logic 310 of downstream device 110 may generate address 360 of an upstream neighbor (e.g., upstream devices 120) of downstream device 110. Validity parameter generation logic 320 of downstream device 110 may generate validity parameter 370 that defines a duration (e.g., in milliseconds) during which the load header may be considered valid (e.g., by upstream devices 120).

As further shown in FIG. 13, a load header that includes the current load status, the address information, and the validity information may be created (block 1340), and a SIP response that includes the load header may be sent (block 1350). For example, in implementations described above in connection with FIG. 3, load header generation logic 330 of downstream device 110 may receive load status 350, upstream address 360, and validity parameter 370, and may generate load header 380 that includes load status 350, upstream address 360, and validity parameter 370. Downstream device 110 may insert load header 380 into SIP responses (e.g., SIP responses 140) that it forwards and/or creates.

Systems and/or methods described herein may provide a rate-based overload control mechanism for use in networks employing the Session Initiation Protocol (SIP) for session management. The overload control mechanism may provide hop-by-hop traffic management. For example, one or more upstream SIP-based devices may be nearest neighbors to an overloaded downstream SIP-based device. The one or more upstream SIP-based devices may attempt to reduce a traffic load of the downstream SIP-based device via the overload control mechanism. A downstream SIP-based device utilizing the overload control mechanism may include a SIP header that contains its current load status in its SIP responses. The overload control mechanism may further reduce and/or restore traffic, sent by upstream SIP-based devices, based on the load information provided in the SIP responses. For example, an upstream SIP-based device may actively determine an amount of traffic to send to a downstream SIP-based device based on a load status of the downstream SIP-based device, as communicated in the headers of its SIP response messages.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-13, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   generating, by a downstream Session Initiation Protocol (SIP) device, a current load status associated with the downstream SIP device;
   generating, by the downstream SIP device, address information associated with an upstream SIP device;
   creating, by the downstream SIP device, a header that includes:
      the current load status,
      the address information, and
      information relating to a validity of the header;
   sending, by the downstream SIP device, a SIP message that includes the header to the upstream SIP device;
   receiving, by the downstream SIP device and from the upstream SIP device, a first amount of traffic that is based on the current load status included in the header of the SIP message; and
   receiving a second amount of traffic,
      the second amount of traffic being less than the first amount of traffic when another load status, associated with the downstream SIP device, is not sent to the upstream SIP device within a particular amount of time after receiving the first amount of traffic.

2. The method of claim 1, where the current load status comprises a value between a first value, indicating that the downstream SIP device is idle, and a second value, indicating that the downstream SIP device is overloaded.

3. The method of claim 2, where the first value is less than the second value.

4. The method of claim 1, where generating the address information comprises:
   generating the address information based on an address, associated with the upstream SIP device, located in a topmost SIP header of a message received from the upstream SIP device.

5. The method of claim 1, where the information, relating to the validity of the header, defines a time during which the header is to be considered valid by the upstream SIP device.

6. The method of claim 5, where the validity information comprises a value that is based on the current load status associated with the downstream SIP device.

7. The method of claim 1, further comprising:
   sending, to the SIP device and within the particular amount of time after receiving the first amount of traffic, the other load status,
      the other load status indicating that the device is overloaded,
      the second amount of traffic being less than the first amount of traffic based on the other load status indicating that the device is overloaded.

8. A device, comprising:
   a memory to store instructions; and
   a processor to execute the instructions to:
      generate a current load status associated with the device, generate address information associated with a Session Initiation Protocol (SIP) device provided upstream from the device,
create a header that includes:
the current load status,
the address information, and
information defining a time during which the header is to be considered valid by the SIP device,
send a SIP message, that includes the header, to the SIP device,
receive, from the SIP device, a first amount of traffic that is based on the current load status included in the header of the SIP message, and
receive a second amount of traffic,
the second amount of traffic being less than the first amount of traffic when another load status, associated with the device, is not sent to the SIP device within a particular amount of time after receiving the first amount of traffic.

9. The device of claim 8, where the current load status comprises a value between a first value, indicating that the device is idle, and a second value, indicating that the device is overloaded.

10. The device of claim 8, where the information, defining the time during which the header is to be considered valid by the SIP device, comprises a value that is based on the current load status associated with the device.

11. The device of claim 8,
where the processor is further to execute the instructions to:
send, to the SIP device, another SIP message that includes a particular load status associated with the device after receiving the first amount of traffic, and
receive, from the SIP device, a third amount of traffic that is based on the particular load status.

12. The device of claim 11, where the first amount of traffic is greater than the third amount of traffic when the particular load status indicates that the device is overloaded.

13. The device of claim 11, where the first amount of traffic is lower than the third amount of traffic when the particular load status indicates that the device is idle.

14. A non-transitory computer-readable medium storing instructions, the instructions comprising:
one or more instructions which, when executed by a device, cause the device to generate a load status associated with the device;
one or more instructions which, when executed by the device, cause the device to generate address information associated with a Session Initiation Protocol (SIP) device provided upstream from the device,
the one or more instructions to generate the address information including:
one or more instructions to generate the address information based on an address received from the SIP device;
one or more instructions which, when executed by the device, cause the device to create a header that includes:
the load status, and
the address information;
one or more instructions which, when executed by the device, cause the device to send a message, that includes the header, to the SIP device;
one or more instructions which, when executed by the device, cause the device to receive, from the SIP device, a first amount of traffic that is based on the load status included in the header of the message; and
one or more instructions which, when executed by the device, cause the device to receive a second amount of traffic,
the second amount of traffic being less than the first amount of traffic when another load status, associated with the device, is not sent to the SIP device within a particular amount of time after receiving the first amount of traffic.

15. The non-transitory computer-readable medium of claim 14, the instructions further comprising:
one or more instructions to generate validity information,
where the validity information defines a time during which the header is to be considered valid by the SIP device, and
where the header further includes the validity information.

16. The non-transitory computer-readable medium of claim 14,
where the instructions further comprise:
one or more instructions to send, to the SIP device, another message that includes a particular load status, associated with the device, after receiving the first amount of traffic, and
one or more instructions to receive, from the SIP device, a third amount of traffic that is based on the particular load status.

17. The non-transitory computer-readable medium of claim 16, where the other load status is greater than a threshold, and
where the third amount of traffic is less than the first amount of traffic based on the particular load status being greater than the threshold.

18. The non-transitory computer-readable medium of claim 16, where the particular load status is less than a threshold, and
where the third amount of traffic is greater than the first amount of traffic based on the particular load status being less than the threshold.

19. The non-transitory computer-readable medium of claim 14, where the load status comprises a value indicating that the device is idle or that the device is overloaded.

20. The non-transitory computer-readable medium of claim 14, the instructions further comprising:
one or more instructions to send, to the SIP device and within the particular amount of time after receiving the first amount of traffic, the other load status,
the other load status indicating that the device is overloaded,
the second amount of traffic being less than the first amount of traffic based on the other load status indicating that the device is overloaded.

* * * * *